US009679162B2

(12) United States Patent
Jackson et al.

(10) Patent No.: US 9,679,162 B2
(45) Date of Patent: Jun. 13, 2017

(54) APPLICATION PERMISSION SETTINGS

(71) Applicant: Google Inc., Mountain View, CA (US)

(72) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 14/187,461

(22) Filed: Feb. 24, 2014

(65) Prior Publication Data
US 2015/0242621 A1 Aug. 27, 2015

(51) Int. Cl.
G06F 12/14 (2006.01)
G06F 21/52 (2013.01)
G06F 21/62 (2013.01)
G06F 21/60 (2013.01)

(52) U.S. Cl.
CPC ........ G06F 21/6281 (2013.01); G06F 21/604 (2013.01)

(58) Field of Classification Search
CPC .......... G06F 9/541; G06F 21/10; G06F 21/51; G06F 21/516; G06F 21/52; G06F 21/6218; G06F 21/121; G06F 21/79; H04L 63/20; H04L 63/107; H04L 63/1425
USPC ......... 726/1–4, 17, 21, 26–30; 709/224, 225
See application file for complete search history.

(56) References Cited

U.S. PATENT DOCUMENTS

| | | | |
|---|---|---|---|
| 8,239,918 B1* | 8/2012 | Cohen | 726/1 |
| 8,627,506 B2 | 1/2014 | Vera et al. | |
| 8,656,465 B1* | 2/2014 | Fong-Jones | G06F 21/6281 713/165 |
| 8,856,859 B2* | 10/2014 | Kirkup | G06F 21/53 713/152 |
| 8,935,393 B1* | 1/2015 | Jackson et al. | 709/224 |
| 2004/0010545 A1* | 1/2004 | Pandya | 709/203 |
| 2004/0083367 A1* | 4/2004 | Garg | G06F 21/602 713/170 |
| 2006/0015740 A1* | 1/2006 | Kramer | G06F 21/52 713/182 |
| 2006/0156384 A1* | 7/2006 | Minium | G06F 21/6218 726/2 |
| 2007/0156961 A1* | 7/2007 | Houzenga | G06F 12/0877 711/118 |

(Continued)

FOREIGN PATENT DOCUMENTS

| | | |
|---|---|---|
| CA | 2619300 | 8/2008 |
| WO | 2013137616 | 9/2013 |

OTHER PUBLICATIONS

Sameer Patil et al, Who gets to know what when: configuring privacy permissions in an awareness application, ACM, 2005.*

*Primary Examiner* — Shanto M Abedin
(74) *Attorney, Agent, or Firm* — Morris & Kamlay LLP

(57) ABSTRACT

Systems, device and techniques are disclosed for automatically determining a permission setting that indicates whether a permission is granted or denied to the application. The automatic determination may be made based on a previous selection by a user. Alternatively, an indication of a permission may be provided to a user and an indication of a permission setting may be received from the user. The permission setting received from the user may be assigned to a permission to an application. Permissions provided to a user may be ordered in a list based on permission or application popularity or frequency.

22 Claims, 6 Drawing Sheets

(56) References Cited

U.S. PATENT DOCUMENTS

| | | | |
|---|---|---|---|
| 2008/0189793 A1* | 8/2008 | Kirkup et al. | 726/27 |
| 2009/0276833 A1* | 11/2009 | Paul | G06F 21/6218 726/4 |
| 2010/0318793 A1* | 12/2010 | Manoharan | G06F 9/44505 713/164 |
| 2011/0173363 A1* | 7/2011 | Conti et al. | 710/267 |
| 2012/0167122 A1* | 6/2012 | Koskimies | 719/328 |
| 2012/0291103 A1* | 11/2012 | Cohen | 726/4 |
| 2013/0055411 A1* | 2/2013 | Yang | H04W 12/08 726/30 |
| 2013/0347096 A1* | 12/2013 | Lee | G06F 21/30 726/17 |
| 2014/0013400 A1* | 1/2014 | Warshavsky et al. | 726/4 |
| 2014/0115693 A1* | 4/2014 | Schieman et al. | 726/17 |
| 2014/0320391 A1* | 10/2014 | Bazaz | 345/156 |
| 2015/0200948 A1* | 7/2015 | Cairns | G06F 21/44 726/4 |

\* cited by examiner

APPLICATION PERMISSION SETTINGS

BACKGROUND

Traditionally, an application that is being installed or updated may present a user with a list of permissions that the application requires. The user may be presented with the list of permissions each time the user intends to install or update an application. As an example, a user may attempt to install a social media application on the user's mobile phone. Prior to installing the application, the user may be presented with fourteen different permissions that the user is required to grant to use the application. If the user grants the permissions, then the application may be installed on the user's mobile phone. It may not be preferable for a user to constantly approve the permissions as the frequency or detail of requesting approval for the permission may be undesirable. Further, a novice user may find it difficult to understand which permissions they should grant to applications.

BRIEF SUMMARY

According to implementations of the disclosed subject matter, an indication of multiple permissions required by an application may be received. For a first permission, a first permission setting that indicates whether the first permission is granted or denied to the application may be automatically determined based upon a previous selection by a first device user. The first device user may be a user of the device installing the application or a user of a device that previously installed the application. Alternatively or in addition, the previous selection may be by a first user such that the first user is associated with a permission setting source. The first permission setting may be automatically assigned for the first permission. For a second permission, an indication of the second permission may be provided to a second device user and an indication of a second permission setting for the second permission may be received from the second device user. The second permission setting may be assigned for the application for the second permission based on the indication. The second user may be a user of the device installing the application and/or may be the same user as the first user. The second device user may be provided with multiple permission indications based on an ordering of the multiple permission indications. The ordering may be based on a permission approval rate or a permission frequency.

According to implementations of the disclosed subject matter, there may be means for indicating multiple permissions required by an application. For a first permission, a means for automatically determining a first permission setting that indicates whether the first permission is granted or denied to the application may be present and may be based upon a previous selection by a first device user. The first device user may be a user of the device installing the application or a user of a device that previously installed the application. Alternatively or in addition, the previous selection may be by a first user such that the first user is associated with a permission setting source. The first permission setting may be automatically assigned for the first permission. For a second permission, a means for providing an indication of the second permission to a second device user may be present and an indication of a second permission setting for the second permission may be received from the second device user. The second permission setting may be assigned for the application for the second permission based on the indication. The second user may be a user of the device installing the application and/or may be the same user as the first user. The second device user may be provided with multiple permission indications based on an ordering of the multiple permission indications. The ordering may be based on a permission approval rate or a permission frequency.

Systems and techniques according to the present disclosure automatically granting a permission based on past actions or providing a permission in an ordered list. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
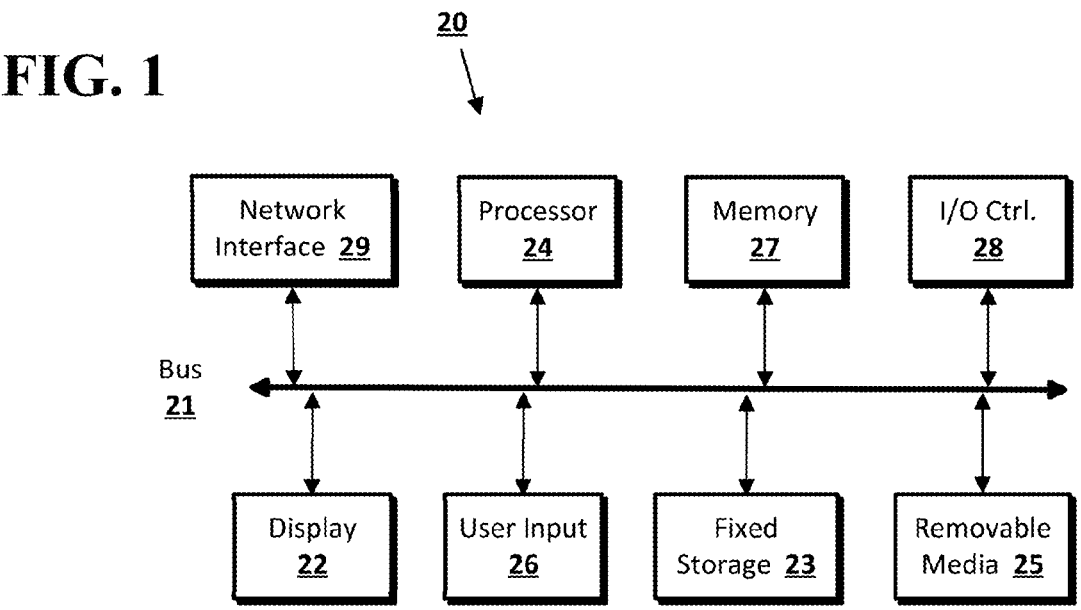
FIG. 1 shows a computer according to an implementation of the disclosed subject matter.

Traditionally a user may approve or deny permissions for an application that the application requests. The approval or denial may result from the user accepting default settings or may result from the user individually approving or denying permissions. However, it may be more efficient to utilize past behavior and either automatically assigning a permission setting (e.g., granted, denied, modified, etc.) based on the past behavior or to provide a user with an ordered list of permissions and receiving indications, from the user, of permission settings for permissions in the ordered list of permissions. Although the present disclosure describes granting a permission, it will be understood that granting a permission includes modifying a permission and granting the modified permission. As an example, an application may request permission "share with friends". The permission may be modified to "share with self" and that modified permission may be granted.

Techniques disclosed herein may automatically grant or deny certain application permissions based on past user behavior. The past user behavior may correspond to the behavior of a user installing an application or may be behavior of one or more users that are designated by the user currently installing an application. As an example, a user may designate a trusted group of friends such that the permission grant or denial preference for the group of friends is applied to the user installing an application. For permissions for which there are no preferences or those that do not meet an automated permission criteria, an ordered list of permissions may be presented to the user installing an application, the order based on criteria disclosed herein.

According to implementations of the disclosed subject matter, an application may require one or more permissions such as, for example, access to a contact list, access to a geo-location, access to a photo album, and the like. These permissions may be requested when a user downloads an application, installs an application, updates an application, when a new permission is present when updating the application, or the like. The past behavior, as applied herein, may be past behavior of the user of the device installing the application. It will be understood that although behavior or actions are described herein as being conducted by a user, the behavior or actions may be associated with a user account or directly with a user device. As an example of past behavior by a user, a user of the device installing an application may have previously provided a permissions levels for one or more permissions. As a more specific example, the user may have previously always allowed 'access to the user's contact list' for one or more previous applications that indicated access to the user's contact list was required. Subsequently, the user may install a current application and, based on the previous action of always allowing access to the user's contact list, the user may not be required to grant or deny the permission 'access to the user's contact list'. Instead, implementations disclosed herein may automatically assign a granted permission setting to the permission based on the past behavior. Alternatively or in addition, the past behavior may be past behavior or a different user or group of users.

As disclosed herein, a user of the device installing an application may designate a different user or group of users as a permission setting source. The device may then follow the permission preferences of the permission setting source, such that if the permission setting source approves a preference, then the current application preference will also be automatically approved. Similarly, if the permission setting source requires a user to grant or deny a permission, then that permission will be provided, for approval, to the user installing an application. As an example, if the permission setting source is a group of users and if a significant majority of the group opts to automatically grant a given permission, then the given permission may also be granted for the user of the device. As a further example, if the permission setting source is a group of users and if a significant majority of the group manually grants a given permission, then the given permission may also be granted for the user of the device.

According to implementations of the disclosed subject matter, an ordered list of permissions may be provided to the user such that the user may be required to provide permission settings for all or a subset of the ordered permissions. Here, the provided permissions can be the permissions that were not automatically assigned a permission setting based on past behavior. Rather, the provided permissions may be presented to a user in a list that is ordered based on an approval rate of the permission or frequency of use of the permission, as disclosed herein.

Figure 3:
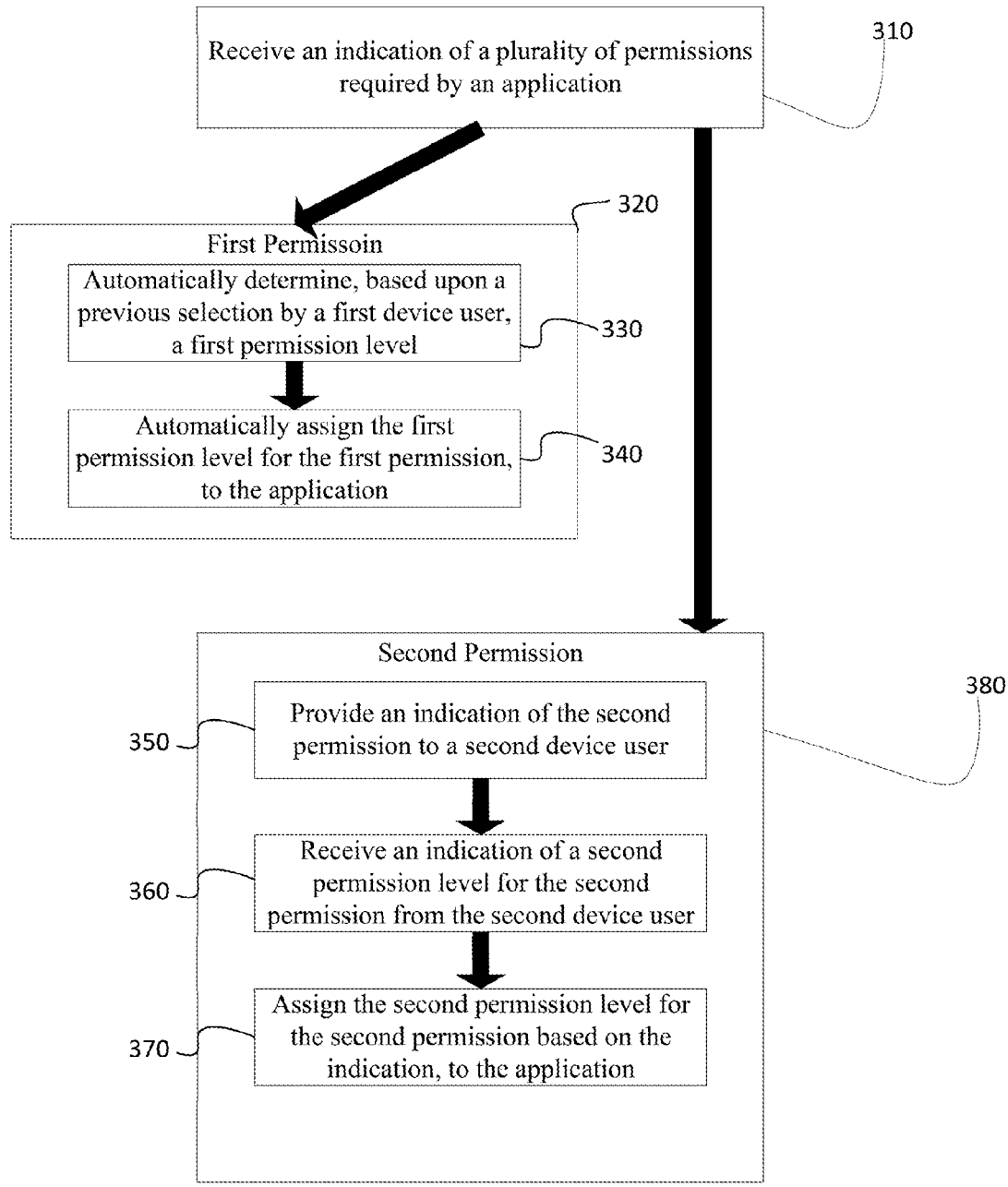
FIG. 3 shows an example process for assigning permissions, according to an implementation of the disclosed subject matter.

According to an implementation of the disclosed subject matter, as shown in FIG. 3 at step 310, an indication of multiple permissions (i.e., two or more permissions) required by an application may be received. The multiple permissions may be permissions that an application that is either being installed or updated requires to function as desired. It will be understood that a "required permission" as disclosed herein may not be necessary for every operation that a respective application may perform, and that at least a portion of the application may be functional despite being denied one or more required permissions. A required permission may be one that a developer intends for a user to grant for any applicable reason such as full operation of the respective application, for data gathering, for providing additional content, or the like. The indication of the multiple permissions may be provided as part of the application to be installed or updated or may be provided separately. As an example, an installer module may extract permission information from an application installation or update file.

According to an implementation of the disclosed subject matter, a previous selection may be used to apply a permission setting to the permission. At 320, a permission may be automatically managed by the arrangement. At step 330, a determination may be made automatically about a permission setting for a permission, based on a previous selection by the user. A permission setting may correspond to an authorization-type decision associated with a permission. The permission setting may be a grant, a denial, a modification of a permission, or the like such that a permission setting is a decision associated with a permission for an application.

According to an implementation of the disclosed subject matter, a previous selection may be a past selection or number of selections associated with a specific permission. The previous selection may correspond to the permission setting that the user installing or updating the application has previously selected or a different user that the user has selected as a permission setting source, as disclosed herein. As an example, for a given permission A, the user installing an application 1 may have previously selected a permission setting corresponding to granting the permission. Based on that previous selection by the user, at step 330 in FIG. 3, the permission setting for a permission A may automatically be assigned to permission A for the installation of application 1. Here, the operating system corresponding to the device on which the application is installed may contain the permission that the application requests. Notably, the user installing application 1 on the user's device may not be presented permission A such that the user need not provide a permission setting corresponding to permission A. The arrangement may automatically determine the permission setting for permission A based on the previous input by the user for permission A. According to an implementation, the previous selection, such as selection of a permission setting, may be a multiple selections such that a permission setting is automatically assigned for a permission if a threshold number of previous selections are received from the user. The threshold may be a raw number or a normalized number such as a percentage. As applied herein, a threshold may be automatically selected based on a number of users (e.g., number of users in a group) or number of instances (e.g., ten permission selections), a type of application, a developer, or the like. Alternatively, a threshold may be manually set by an administrator or developer. As an example, the permission setting for a permission may be automatically assigned if the user has granted the permission at least 98% of the times. The threshold may vary based on the type of the permission setting. As an example, if the permission setting is to grant the permission, based on past selections granting the permission, then the threshold may be 90% to automatically assign the granted permission setting. However, if the permission setting is to deny the permission, based on past selections denying the permission, then the threshold may be 60% to automatically deny the permission setting. More generally, the threshold may be any suitable level or value, and may be set or selected based upon any appropriate metric or measurement.

Figure 4:
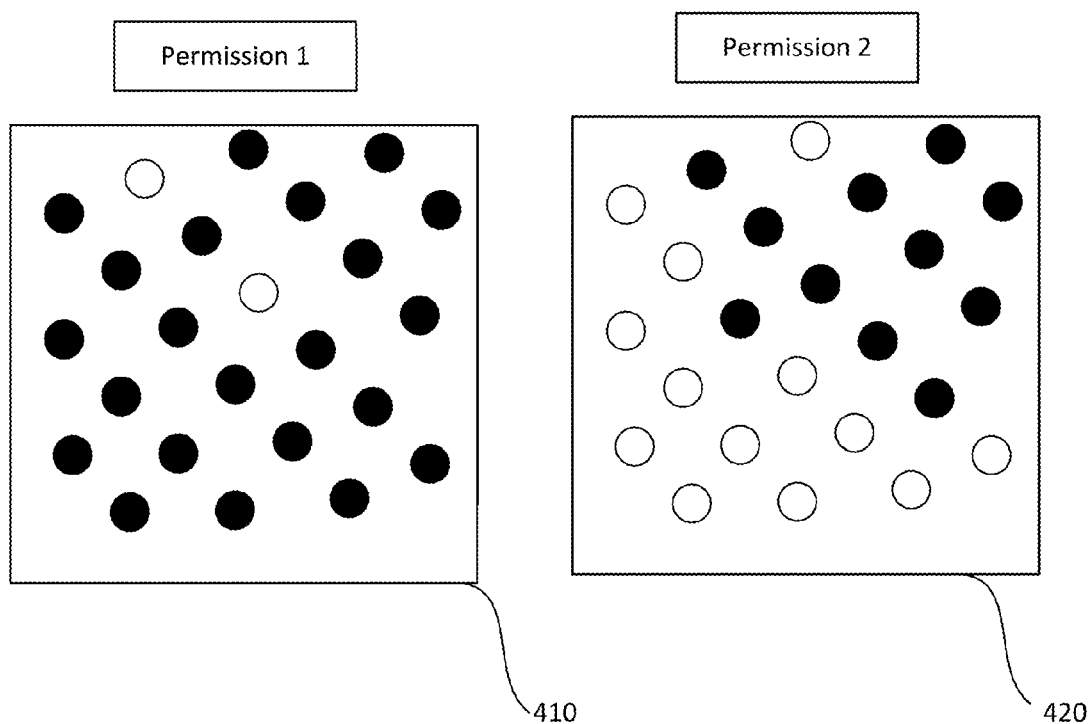
FIG. 4 shows example permission settings by a user, according to an implementation of the disclosed subject matter.

As an illustrative example of automatically assigning a permission setting for permissions, FIG. 4 contains box 410 such that each circle within box 410 represents a selection by a user, a filled in circle represents a granted permission for permission 1, by the user installing or updating the application corresponding to the permission, and an empty circle represents a denial of permission, by the user installing or updating the application corresponding to the permission, for permission 1. As a specific example, if the threshold for automatically assigning a permission setting corresponding to granting the permission is 90%, then the permission may be automatically granted if the user granted the permission at least 90% of the time it was indicated as a required permission by previously-considered applications. As another example, if the threshold for automatically assigning a permission setting corresponding to denying the permission is 75%, then the permission may be automatically denied if the user denied the permission at least 75% of the time it was indicated as a required permission by previously considered applications. As shown in FIG. 4, the user may grant the permission more than 90% of the times, as represented by box 410. Accordingly, permission 1 may be automatically assigned a permission setting corresponding to granted based on the user's previous selections. Box 420 may represent the number of times a user granted or denied a permission 2. Each circle within box 420 represents a selection by a user. A filled-in circle represents a granted permission for permission 2, such as by the user installing or updating the application corresponding to the permission, and an empty circle represents a denial of permission, by the user installing or updating the application corresponding to the permission, for permission 2. As shown by the amount of filled in vs. empty circles, the number of grants may not exceed 90% and the number of denials may not exceed 75%. Accordingly, in this example permission 2 may be provided to the user installing or updating the application as part of an ordered list as disclosed herein, because the number of times the user has previously selected a permission setting for permission 2 does not fall above or below the relevant threshold.

According to an implementation, a user may provide a permission setting for a permission such that the provided permission setting applies to that permission during all subsequent requests for the permission. The permission setting may be applied to that permission during all subsequent requests based on a setting or selection such as a user selecting an option to apply the permission setting to a permission for all subsequent requests of the permission. As a specific example, a permission may be provided to a user installing or updating an application as part of an ordered list. The user may grant or deny the permission and may also select an option to apply the instant selection (i.e., grant or deny) to all subsequent instances of the permission (i.e., for applications downloaded or updated in the future).

A minimum number of selections of permission settings for a permission may be required before a permission setting is automatically selected for a given permission. For example, if a user chooses to grant permission for permission A five times (e.g., for five different application installs that all require permission A), and if the threshold for the minimum number of selections of a permission setting is 10, then permission A would not be automatically granted based on the previous 5 user selections (i.e., below the threshold of 10). However, for the same threshold, if a user chooses to grant permission for permission A ten times, then the permission setting for the permission A would be automatically set to be granted during the eleventh time the permission is required.

Figure 5:
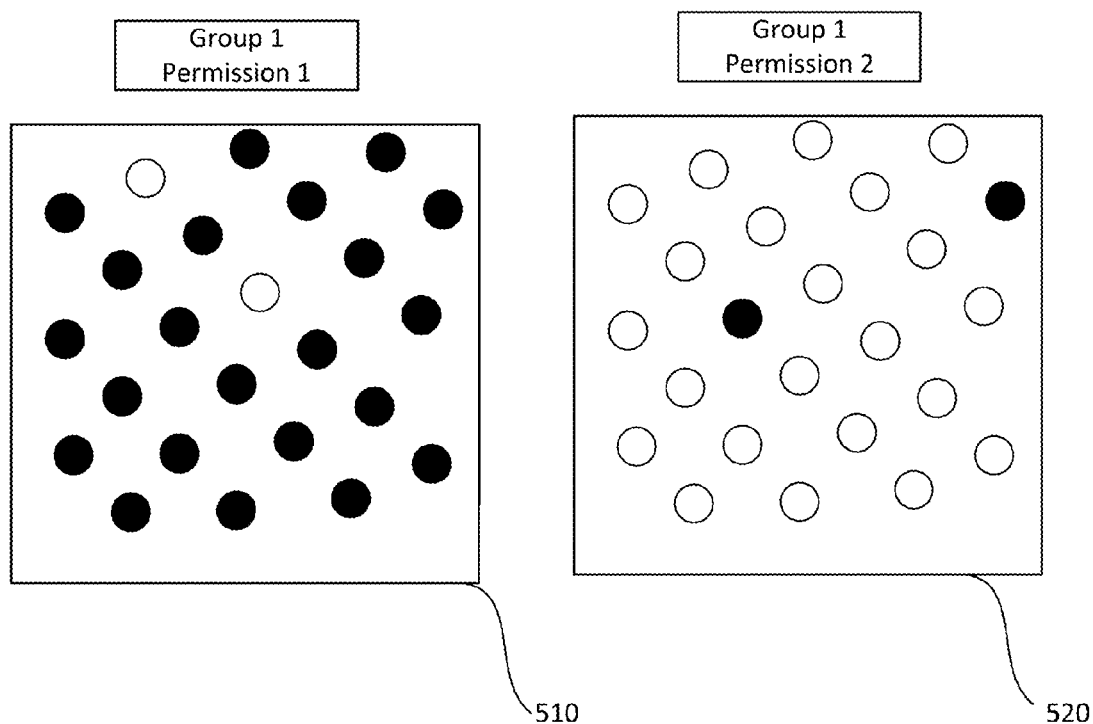
FIG. 5 shows example group permission settings by a group of users, according to an implementation of the disclosed subject matter.

The previous selection may correspond to the permission setting that a group of users, or a global set of users have previously selected. As disclosed herein, the user may select a permission setting source and the permission setting source may be a group of people or may be all users that have provided a permission setting for the permission (i.e., a global user group). The previous selection may correspond to the permission setting that a threshold number of users provide. The threshold may be a raw number or a normalized number such as a percentage, as disclosed herein. Additionally, the threshold may vary based on the type of the permission setting, as disclosed herein, and may either be the same for all applications or may vary between applications. As an illustrative example, as shown in FIG. 5, box 510 shows circles that represent multiple users that are within a group 1 that is designated as a permission setting source by a user installing an application. Each circle within box 510 represents a user, a filled in circle represents a user that granted permission for permission 1 and an empty circle represents a user that did not grant permission for permission 1. As a specific example, if the threshold for automatically assigning a permission setting based on previous selections is 80% then the permission may be automatically granted if at least 80% of the people in the group granted the permission. As shown in box 510, more than 80 of the users in group 1 granted the permission and, thus, the permission may be automatically assigned a permission setting corresponding to granted based on group 1's selections. As another example, as shown in FIG. 5, box 520 shows multiple circles that represent users that are within a group 1 that is designated as a permission setting source by a user installing an application. Each circle within box 520 represents a user, a filled in circle represents a user that granted permission for permission 2 and an empty circle represents a user that did not grant permission for permission 2. As a specific example, if the threshold for automatically assigning a permission setting based on previous selections is 80% then the permission may automatically granted or denied if at least 80% of the group grants or denies the permission. Essentially, if 80% of the users in the group provide a specific permission setting, then that permission setting is automatically applied for the user that designated the group as her permission setting source. As shown in box 520, more than 80% of the users in group 1 denied permission for permission 2 and, thus, permission 2 may be automatically assigned a permission setting corresponding to denied, based on group 1's selections.

A minimum number of users that select permission settings for a permission may be required before a permission setting is automatically selected for a given permission. For example, if five users grant permission for permission B, and if the threshold for the minimum number of users that select a permission setting is 10, then permission B may not be automatically granted based on the previous 5 user selections. However, for the same threshold, if a 10 users choose to grant permission for permission B, then the permission setting for the permission B may be automatically set to be granted during the installation of the application associated with permission B when an eleventh user installs the application. Here, the threshold may be any applicable representation such as a percentage or a ratio.

Figure 6:
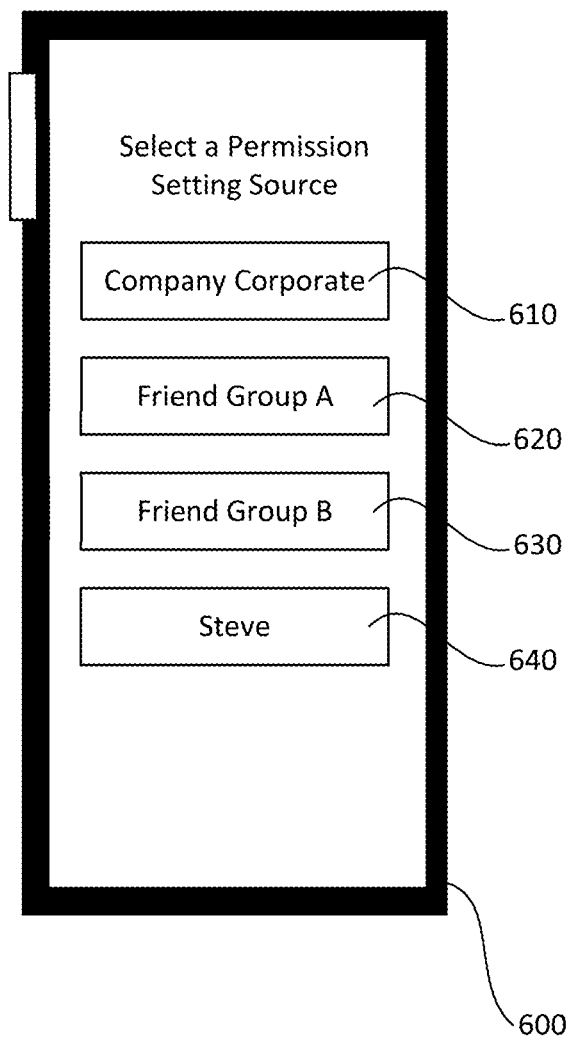
FIG. 6 shows an example user interface for permission setting sources, according to an implementation of the disclosed subject matter.

According to an implementation of the disclosed subject matter, a permission setting source may be designated as the source that a user's permission activity mimics or partially mimics. A permission setting source may be another individual (e.g., a user, a user's individual device, a user account, etc.), or may be a group that contains multiple individuals (e.g., a friends group, a group based on a common property, a group of individuals selected separately, an organization, all users using similar applications/devices, etc.). A user of a user device may select a permission setting source via a user device, as shown in FIG. 6. A user may access one or more permission setting sources via a mobile phone 600. As shown, the user may select a company corporate source 610, a Friend group A 620 or B 630, or an individual, Steve 640. As a more specific example, the selection of a company corporate source 610 may result in the applying a companies recommended settings to the user device such that the permission values for permissions are applied based on the company's recommended settings.

According to an implementation of the disclosed subject matter, a permission may be managed by the arrangement at step 380 in FIG. 3 such that a user may provide a permission setting for the permission. At step 350 an indication of the permission may be provided to a user via a user device. As an example, a user may be provided with one or more permissions prior to installing an application such that the user can provide permission values for the permissions. Accordingly, at 360, an indication of a permission setting for a provided permission may be received based on user input. It will be understood that a user may provide permission values for multiple permissions at the same time such as by selecting a multi permission button (e.g., approve all permissions, deny all permissions, accept default values, etc.). At step 370, the indication of the permission setting for a permission, as provided by a user, may be assigned to the permission. As an example, a user may be provided with a request for a permission to allow access to the user's photo album, when installing an application. The user may select an option to deny the permission and, based on the selection, the denial may be assigned to the permission.

According to an implementation of the disclosed subject matter, multiple permissions may be managed such that a user may provide a permission setting for the permission instead of the multiple permission being automatically managed. The multiple permissions may be provided to a user, via a user device, in an ordered list. The list may be ordered based on an approval rate or may be ordered based on permission frequency.

An ordered list may be ordered based on an approval rate such that a permission that is least approved may appear towards the portion of the list that is most visible to a user (e.g., the top of the ordered list). Essentially, a permission that is least approved may be a permission that user installing or updating an application may be most interested in. Accordingly, such a permission may appear at the part of the ordered list that is most visible to a user. Similarly, the ordered list may be ordered such that a permission that is most rejected is made more visible to a user (e.g., by being placed at the top of the ordered list). A permission that is least approved may be the same as a permission that is reject, or, a permission that is least approved may not be explicitly rejected whereas a permission that is rejected is explicitly rejected.

An ordered list may be ordered based on permission frequency such that a permission that is least required, when installing applications, may be made more visible to a user (e.g., by being placed at the top of the ordered list). Essentially, permission settings for a permission that is not very frequently required when installing applications may not be established as much as permission settings for a permission that is required when installing more applications. Accordingly, such a permission may be made more visible to a user.

Figure 7:
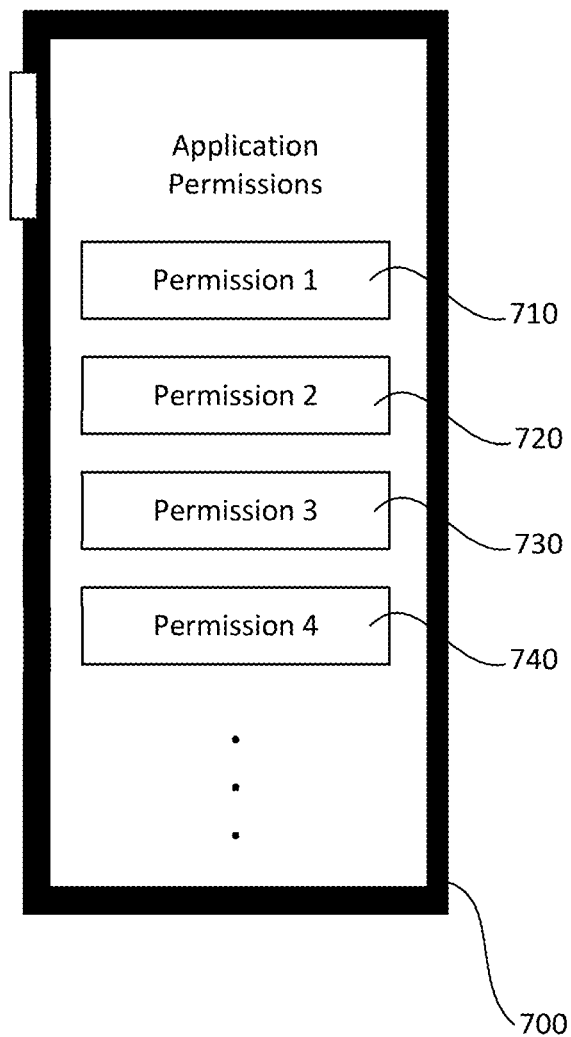
FIG. 7 shows an example user interface for permissions, according to an implementation of the disclosed subject matter.

In an illustrative example, as shown in FIG. 7, multiple permissions may correspond to an application such as permission 1 710, permission 2 720, permission 3, 730, and permission 4, 740. The permissions may be ordered such that the permissions near the top are more easily visible to a user than the permissions near the bottom of the list. The order may be determined based on the frequency of the type of permission appearing throughout different applications that the arrangement is aware of Essentially, the permissions may be listed such that the permissions that frequently appear in different applications are listed at the bottom and permissions that less frequently appear in applications are listed near the top.

According to an implementation of the disclosed subject matter, a popularity level of an application may be a factor in determining whether a permission associated with the application is automatically managed or if the permission is to be provided to a user. A popularity level may be based on the number of downloads of an application, the promotion associated with the application, the developer of the application, the type of application, or the like. If the application meets or exceeds a popularity threshold then one or more permissions associated with the application may be automatically managed such that they would not be presented to a user. Alternatively, if the application popularity is below a popularity threshold then one or more permissions associated with that application may be provided to a user such that the user is requested to provide a permission values for the one or more permissions. Here, the popularity level of an application may be a factor in addition to the techniques disclosed herein such as previous selections, designation of a permission setting source, ordering a list, and the like.

According to an implementation of the disclosed subject matter, one or more other external factors, in addition to past behavior, may be considered when determining whether to automatically grant or deny a permission. An external factor may any applicable automatically or manually applied factor and can include the age of an application (e.g., an application released within the past 4 days always requires a user to grant or deny permissions), the trust level of a developer, a security threshold, or the like.

Implementations of the presently disclosed subject matter may be implemented in and used with a variety of component and network architectures. As an example, a transmitter or a receiver may be controlled using the computer or network architectures disclosed herein. As another example, a transmitter may be used to charge a computer or network device, as disclosed herein. FIG. 1 is an example computer 20 suitable for implementing implementations of the presently disclosed subject matter. A smart power device may implement a computer architecture as disclosed here or may apply any applicable architecture to accomplish the disclosed techniques. The computer (e.g., microcomputer) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
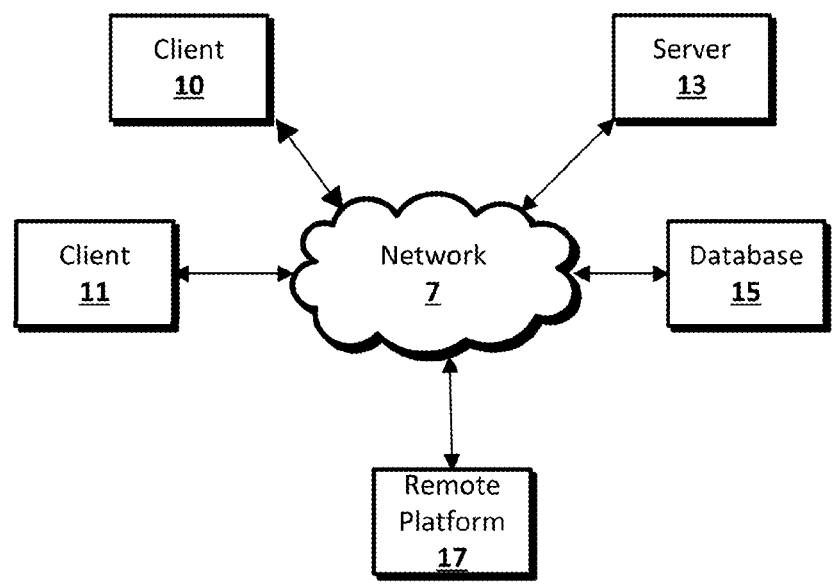
FIG. 2 shows a network configuration according to an implementation of the disclosed subject matter.

FIG. 2 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:
1. A method comprising:
   receiving a designation of a first group of users as a permission setting source for a computing device;

receiving an indication of a plurality of permissions required by an application responsive to initiation of an installation or an update of the application on the computing device;

for a first permission, from the plurality of permissions, automatically determining by the computing device, based upon a threshold number of previous permission setting selections made by the first group of users, respectively, a first permission setting that indicates whether the first permission is granted or denied to the application;

responsive to determining that a popularity level for the application meets or exceeds a popularity threshold, automatically assigning, by the computing device, the first permission setting for the first permission based on the determination, to the application;

for a second permission, providing, by the computing device, an indication of the second permission to a second device user;

receiving, by the computing device, an indication of a second permission setting for the second permission from the second device user; and assigning, by the computing device, the second permission setting for the second permission based on the indication, to the application.

2. The method of claim 1, wherein users in the first group are users of a device similar to or the same as the computing device.

3. The method of claim 1, wherein users in the first group are users that have previously installed the application.

4. The method of claim 1, wherein the second device user is a user of the device installing the application.

5. The method of claim 1, wherein users in the first group are individuals associated with a first organization.

6. The method of claim 1, wherein the previous selection by the first device user corresponds to a selection of a permission setting.

7. The method of claim 1, further comprising
if the popularity level is below the popularity threshold then designating a permission for the application as the second permission and providing an indication of the second permission to the second device user.

8. The method of claim 1, wherein providing an indication of the second permission to a second device user further comprises:
ordering a plurality of permission indications to be provided to the second device user, wherein the ordering is based on a permission approval rate;
providing the plurality of permission indications based on the ordering.

9. The method of claim 1, wherein providing an indication of the second permission to a second device user further comprises:
ordering a plurality of permission indications to be provided to the second device user, wherein the ordering is based on a permission frequency;
providing the plurality of permission indications based on the ordering.

10. The method of claim 1, wherein an indication of a second permission setting is provided to the second user based on one selected from the group consisting of: downloading the application, installing the application, updating the application, and presence of a new permission when updating the application.

11. The method of claim 1, wherein automatically determining a first permission setting further comprises applying an external factor.

12. A system comprising:
a memory; and
a processor circuit, the processor circuit configured to:
receive a designation of a first group of users as a permission setting source for the system;
receive an indication of a plurality of permissions required by an application responsive to initiation of an installation of the application in the memory or an update of the application;
for a first permission, from the plurality of permissions, automatically determine, based upon a threshold number of previous selections made by the first group of users, respectively, a first permission setting that indicates whether the first permission is granted or denied to the application;
determine a popularity level for the application;
automatically assign the first permission setting for the first permission based on the determination, to the application, when the popularity level meets or exceeds a popularity threshold;
for a second permission, provide an indication of the second permission to a second device user;
receive an indication of a second permission setting for the second permission from the second device user; and
assign the second permission setting for the second permission based on the indication, to the application.

13. The system of claim 12, wherein users in the first group are users of a device that includes the system.

14. The system of claim 12, wherein users in the first group are users that have previously installed the application.

15. The system of claim 12, wherein the second device user is a user of the device installing the application.

16. The system of claim 12, wherein users in the first group are associated with a first organization.

17. The system of claim 12, wherein the previous selection by the first device user corresponds to a selection of a permission setting.

18. The system of claim 12, further configured to:
designate a permission for the application as the second permission when the popularity level is below the popularity threshold and provide an indication of the second permission to the second device user.

19. The system of claim 12, wherein providing an indication of the second permission to a second device user further comprises:
ordering a plurality of permission indications to be provided to the second device user, wherein the ordering is based on a permission approval rate;
providing the plurality of permission indications based on the ordering.

20. The system of claim 12, wherein providing an indication of the second permission to a second device user further comprises:
ordering a plurality of permission indications to be provided to the second device user, wherein the ordering is based on a permission frequency;
providing the plurality of permission indications based on the ordering.

21. The system of claim 12, wherein an indication is provided to the second user based on one selected from the group consisting of: downloading the application, installing the application, updating the application, and presence of a new permission when updating the application.

22. The system of claim 12, wherein automatically determining a first permission setting further comprises applying an external factor.

\* \* \* \* \*